3,141,764
TREATMENT OF IRON ORES CONTAINING NICKEL AND CHROMIUM
Kiyoto Matsuzuka, Junjiro Momozaki, and Yoshinori Shirane, Kumamoto, Japan, assignors to Yawata Iron and Steel Co., Ltd., Tokyo, Japan
No Drawing. Filed Dec. 28, 1960, Ser. No. 78,817
Claims priority, application Japan Feb. 15, 1960
2 Claims. (Cl. 75—82)

This invention relates to a process for the separation of nickel from iron ores containing nickel and chromium by which the nickel content is separated and removed therefrom, and more particularly, relates to a treatment in which the nickel content is extracted by the steps which comprises treating the iron ore containing nickel and chromium which has been already roasted for reduction with a dilute sulphurous acid solution, and then separating iron and nickel in this leach solution.

Heretofore, of the important iron ores containing nickel and chromium, an essential and major one has been called laterite, which has been reported to have vast reserves all over the world, but, at present, it is not suitable for a raw material for iron or steel manufacture, because it contains a substantial amount of alumina as well as a small amount of nickel and chromium. In reference to the separation and removal of the nickel and chromium content, innumerable researches have been conducted and many patents have been granted. Of processes for removing the nickel content by extraction, the treatment of the ore roasted for reduction with a sulphuric acid is generally used, but, by this method, a considerable amount of iron as well as the nickel content is leached. Therefore, the iron content should be separated from the nickel content for recovery of iron. As the leached iron content is converted into ferrous sulphate and ferric sulphate, it is considered that the oxidation of the ferrous sulphate into ferric sulphate with a view to removing the iron is very difficult, because this oxidation requires an elevated temperature, a high pressure, and an extended period of time. It is also reported that with the progress of oxidation as the concentration of sulphuric acid in the liquor increases, the rate of oxidation rapidly decreases (see, for example, K. A. Kobe and W. Dickey: Ind. Eng. Chem., vol. 37, 1, 1945).

This invention contemplates the provision of a treatment process which has solved the above disadvantage. In accordance with the process of this invention, instead of sulphuric acid a dilute sulphurous acid is used to extract the nickel content from the ore containing nickel and chromium which has been subjected to a reducing roast, by which the iron content dissolved in the leach liquor is maintained as low as possible, and this iron is easily separated from nickel to recover it by a simple treatment such as air blowing.

It is an object of this invention to provide a process for treating the iron ore containing nickel and chromium in order to remove the nickel content in a most economical and commercial manner.

Another object of the invention is to provide a treating process in which the iron content dissolved in the leach liquor resulting from the extraction of the nickel content from the iron ore containing nickel and chromium is completely recovered with the separation of nickel.

A further object of the invention is to provide a treating process in which chromium is easily and effectively removed by adding soda ash and lime to a magnetite ore resulting from the residue and roasting it in an oxidizing atmosphere, said magnetite ore being obtained from the residue resulting from the extraction of nickel by subjecting the iron ore containing nickel and chromium to the abovementioned reducing roast treatment and then to leaching it with the dilute sulphurous acid liquor, and said roasted ore being accessible to the removal of chromium due to its magnetite form.

In accordance with the process of this invention, the lateritic iron ore, which constitutes the major part of the iron ores containing nickel and chromium among the ore reserves throughout the world, is subjected to a dilute sulphurous acid leach process by which nickel and cobalt are extracted, and further, the separation of nickel from iron is effected by an air blowing process.

In a conventional leach process for extracting the nickel content from garnierite ore, the latter is subjected to a leach with sulphurous acid liquor after the reducing roast, but, in general, as this process requires a concentrated sulphurous acid, a substantial amount of iron is also leached together with nickel.

As is well known, laterite ore usually contains cobalt in an amount corresponding to about 10% of the nickel contained in the ore, and usually cobalt behaves similarly to nickel. Accordingly, the extraction of nickel will also include extraction of cobalt, whenever the latter is present in the ore.

However, we have discovered after an extensive study by means of X-ray that the nickel content of the lateritic ore contains no garnierite whatever, but all of it exists in the form of an oxide. Accordingly, it has been found that laterite is more easily reducible than garnierite and also can be leached with a very dilute sulphurous liquor.

Thus, we can attain over 80% of the extraction efficiency of nickel with such a dilute sulphurous liquor as in the order of 0.5% to 5%, and preferably 0.5%+3% by weight of $SO_2$ after having subjected laterite to the reducing roast, and in addition, we can inhibit an amount of leached iron to less than 10% iron, which is also leached together with nickel, but undesirable. This finding is most significant to industry and has advantages enumerated below:

(1) As the extraction of iron is maintained to the extent of 5 to 10%, 90 to 95% of the iron content contained in the laterite can be obtained as a magnetite ore containing no nickel whatever.

(2) An amount of dissolved iron and impurities other than nickel in the nickel leach liquor is considerably less than that of prior art, so the subsequent processing of the liquor is not difficult.

(3) As the liquor consists of a dilute solution of sulphurous acid, it is easy to prevent the loss resulting from evaporation during the operation step.

(4) The wear caused by the corrosion of the equipment due to the sulphurous acid liquor can be reduced.

Examples showing the above process consisting of leaching the laterite subjected to a reducing roast with a dilute sulphurous acid liquid are given hereinbelow.

EXAMPLE 1

Laterite of chemical analysis of 50.5% Fe, 1.21% Ni, 2.07% Cr, 6.40% $Al_2O_3$ and 3.3% $SiO_2$ crushed to the fineness of —30 mesh is thoroughly mixed with 5% pulverized coal of —48 mesh added thereto, and the resultant material is charged into a rotary kiln (its inner diameter being 15 cm., its length, 400 cm.; one revolution per minute; its inclination, $\frac{1}{20}$) to be reduced by an incomplete combustion with a coal gas. Nickel is extracted from the above reduced ore with the use of various concentrations, percent $SO_2$ by weight, and at the same time, iron is also extracted with the determination of its extraction rate, respectively. The results are shown in Table 1 wherein the rate of reduction is the amount of reduced metal, principally iron, in the reduced ore calculated in percent of the weight of the total content of reducible metal (iron) in the unroasted ore; and wherein the rate of extraction is the amount of iron or nickel, respectively, in solution calculated in percent of the amount of the respective metal in the unleached ore.

*Table 1*

| Samples | Extracting conditions | | | | | Rates of extraction | |
|---|---|---|---|---|---|---|---|
| Reducing temperature | Rate of reduction (percent) | SO$_2$, percent by weight | Solution temperature, °C. | Agitating time, minutes | Concentration of pulp by weight | Ni, percent | Fe, percent |
| 900 | 52.9 | 0.51 | 17.0 | 60 | 10 | 80.82 | 5.10 |
| 900 | 52.9 | 0.84 | 17.0 | 30 | 10 | 82.65 | 5.50 |
| 820 | 44.9 | 0.98 | 17.8 | 30 | 10 | 83.68 | 6.96 |
| 900 | 52.9 | 1.15 | 17.8 | 30 | 10 | 84.32 | 7.91 |
| 900 | 52.9 | 1.93 | 18.3 | 10 | 10 | 85.32 | 8.99 |
| 900 | 52.9 | 2.10 | 17.9 | 30 | 10 | 86.18 | 9.21 |
| 900 | 52.9 | 5.37 | 18.0 | 30 | 10 | 88.58 | 19.26 |
| 900 | 52.9 | 6.69 | 18.4 | 30 | 10 | 89.78 | 21.75 |

Table 1 shows that the rate of extraction of nickel will amount to 80 to 86%, and that of iron to 5 to 10% at the concentration of 0.5 to 3% SO$_2$ by weight of dilute sulphurous acid.

In order to remove chromium from the residue magnetite, which is added with 20% soda ash and 10% slaked lime, and then, formed into pellets by a disk-type balling device. These pellets are roasted in a down-draft sinter machine at the temperature of 1000° C. for the period of one hour. When the roasted pellets are leached in the hot water of the temperature of 70° C. for the period of two hours, the rate of extraction of chromium has amounted to 90.0%.

Now, the recovery of iron from the nickel leach liquor will be described hereinafter.

In general, when the iron ore containing nickel is treated with sulphuric acid, iron is converted into ferrous and ferric sulphate. However, the oxidation of ferrous sulphate into ferric sulphate in order to remove iron therefrom is very difficult as described hereinbefore.

However, in the process of this invention, as the laterite roasted for reduction is leached with the dilute sulphurous acid liquor, most of iron and nickel in the resultant leach liquor is of primary sulphite. If, then, ferrous sulphite in the iron content is once oxidized into ferrous sulphate, the oxidation of the latter into ferric sulphate in order to remove iron therefrom is extremely hard as evident from the foregoing.

Accordingly, the invention contemplates the attainment of two objects, removal of sulphur as well as iron and prevention of increase of acid concentration in the leach liquor, by the process which comprises permitting no oxidation to occur from ferrous sulphite to ferrous sulphate but removing iron immediately without delay. The process referred above consists in removing free SO$_2$ from the nickel leach liquor resulting from the above-mentioned dilute sulphurous acid liquor by vacuum distillation, and thereafter agitating the resultant liquor, the color of which turns into reddish brown, which shows that ferrous sulphite is oxidized into ferric sulphite as follows:

$$FeSO_3 + O_2 \rightarrow Fe_2(SO_3)_3$$

Literature shows that this ferric sulphite is an unstable compound, which tends to become ferrous sulphate immediately if left untouched.

The feature of the invention lies in the process which comprises subjecting ferric sulphite to decomposition without delay in such manner that the oxidation of ferric sulphite to ferrous sulphate will not take place. This is accomplished by a simple commercial process which comprises heating the leach liquor to a temperature of 60 to 100° C. while blowing air thereinto, and this reaction is shown as follows:

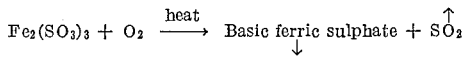

$$Fe_2(SO_3)_3 + O_2 \xrightarrow{heat} \text{Basic ferric sulphate} + SO_2$$

By heating the leach liquor and oxidizing it by blowing in air, the ferric sulphite is decomposed into basic ferric sulphate and SO$_2$. More particularly, a chemical reaction by which SO$_2$ is separated in the above decomposition contributes not only the recovery of SO$_2$, but also the prevention of an increase of acid concentration. This contribution is particularly significant.

This simple process consisting of blowing air thereinto while decomposing the ferric sulphite by heating it to a temperature of 60° to 100° C. is an important factor to industry.

By a mechanical agitation or stirring only without recourse to air blowing, several steps of filtration from the precipitate and an extended period of heating time therefor are required before the decomposition is completed. However, on the contrary, by the air blowing process, a comparatively short period of time at a time is adequate to attain the desired results. Furthermore, in the air blowing process, the contact area of air with liquid will be improved by forming a number of fine foams, which will result in a reduced period of time. In addition, the combined action of agitation and air blowing will accelerate the decomposition.

A process of removing sulphur and iron resulting from the decomposition of ferric sulphite by the above air blowing step will be referred to as "air de-ironization," in this invention.

By the application of the above process, prior to an autoclave treatment of the leach liquor under a high temperature and a high pressure with a view to removing iron therefrom, the removal of the major part of sulphur and iron can be effected at an intermediate step in a very simple manner, hence the final autoclave treatment step can be carried out in an easier and more complete manner than heretofore.

An example showing the above process of air de-ironization will be described hereinbelow:

EXAMPLE 2

Experiment results of air de-ironization combined with mechanical agitation conducted on the dilute sulphurous acid leach liquor (extraction rate: 84.3% Ni and 9.53% Fe) of the reduced lateritic ore of chemical analysis mentioned hereinbefore are shown in Table 2:

*Table 2*

| Ingredient | Leach liquor | Vacuum-distilled liquor | Precipitate filtrate, primary | Precipitate filtrate, secondary |
|---|---|---|---|---|
| Fe(g./l.) | 2.14 | 2.12 | 1.72 | 0.91 |
| Total-S(g./l.) | 4.64 | 2.52 | 2.31 | 1.06 |
| S of SO$_4$(g./l.) | 0.59 | 0.59 | 0.60 | 1.02 |
| pH | 2 | 5.1 | 4.7 | 1.8 |

When the leach liquor is subjected to vacuum distillation, free SO$_2$ is removed. Next, the resultant liquor is agitated while heated at the temperature of 90° C. with the result that basic iron sulphate is precipitated while SO$_2$ is being evaporated off. The resultant precipitate is filtered. This operation is repeated again and again until the iron content in the leach liquor is 0.91 g./l., the total S 1.06 g./l., and S of SO$_4$ 1.02 g./l., which shows that the rate of de-ironization (iron removal) amounts to 57.5% and the rate of desulphurization to 77.0%. This means the desulphurization has reached its end point, and the period of time required for agitation has amounted to three hours.

Table 3

| Blowing time | 30 minutes | | 60 minutes | |
|---|---|---|---|---|
| Ingredient | Leach liquor | Precipitate filtrate | Leach liquor | Precipitate filtrate |
| Fe(g./l.) | 2.0 | 0.71 | 2.62 | 0.38 |
| Total-S(g./l.) | 4.7 | 1.02 | 5.10 | 1.08 |
| S of SO$_4$(g./l.) | 0.74 | 0.94 | 0.56 | 0.94 |
| pH | 1.1 | 1.4 | 1.0 | 1.2 |

Table 3 shows the results obtained from the same leach liquor which has been subjected to the process consisting of heating it to the temperature of 90° C. while blowing air into it by a blower. When air blowing is carried out for a period of 30 minutes, the rate of de-ironization is 64.5% while that of desulphurization 78.3%, and for a period of one hour, the de-ironization 85.5% while the desulphurization 78.8%.

It is clear from the results of the above examples that the air blowing process is more effective than the mechanical agitation.

An analysis of the basic iron sulphate precipitated by the above process and dried at the temperature of 100° C. shows that it consists of 43.3% Fe, 5.99% S and 32.2% ignition loss. When this iron sulphate is calcined in accordance with the first process described hereinbefore, it is found that it consists of hematite containing 5.30% Al$_2$O$_3$, and it is a good raw material for iron manufacture with traces of nickel and chromium.

In carrying out the air de-ironization process, it is considered that there are two processes combined with an autoclave treatment, the flowsheets of which are shown hereinbelow:

In process A, the precipitate of basic iron sulphate produced by the air de-ironization process is separated by filtration and the filtrate is subjected to an autoclave treatment. When the precipitate is calcined, sulphurous acid gas is produced. At the same time when the sulphurous acid gas is recovered, iron oxide containing no nickel and chromium is obtained, which is suitable for a raw material for iron manufacture. Nickel and cobalt where such is present in the ore are extracted from the leach liquor by the autoclave treatment.

In process B, the precipitate of basic iron sulphate produced by the air de-ironization process as it is together with the leach liquor is subjected to an autoclave treatment. Then, the precipitate separated by filtration is calcined to give iron oxide, and simultaneously, a nickel or nickel-cobalt solution is obtained.

It will be understood that the above two processes are effective. Further, in case a very small quantity of free sulphurous acid is produced in carrying out an extracting operation with a dilute sulphurous acid liquor, a vacuum distillation step may be omitted in both processes.

An example of the effect obtained from the combined process of air de-ironization and autoclave treatment is shown hereinbelow:

EXAMPLE 3

When the air de-ironization process is carried out prior to the high pressure treatment by an autoclave, the actual effects imparting to the autoclave treatment are shown in Table 4 as follows:

Table 4

| Prior to application of pressure, Fe in the liquor, g./l. | Prior to application of pressure, total S in the liquor, g./l. | After application of pressure, Fe in the liquor, g./l. |
|---|---|---|
| 8.7 | 6.6 | 0.18 |
| 7.5 | 6.0 | 0.17 |
| 4.9 | 4.8 | 0.15 |
| 1.6 | 2.0 | 0.08 |
| 1.2 | 1.7 | 0.06 |

PROCESS A

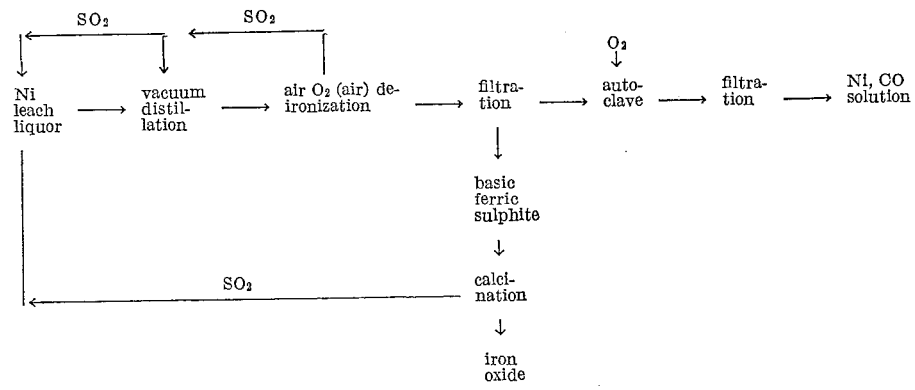

PROCESS B

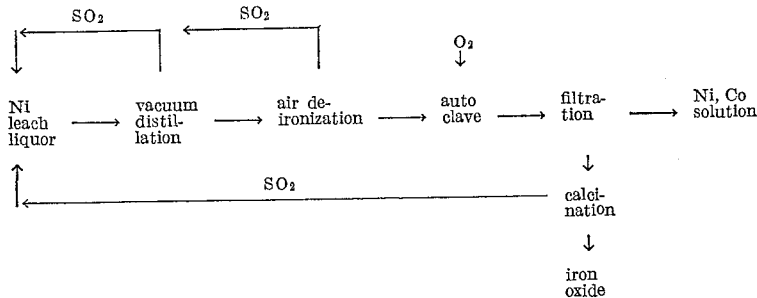

The treating conditions by the autoclave are: the partial pressure of oxygen is 5 kg./cm.$^2$, the total pressure thereof 20 kg./cm.$^2$, the temperature 210° C., and an operating time 2 hours. When the air de-ironization is carried out prior to the autoclave treatment, it has been found out that the autoclave treatment can be performed to advantage. When the leach liquor containing 8.7 g./l. Fe and 6.6 g./l. total S is treated under pressure, Fe is 0.18 g./l.

while, on the other hand, Fe is reduced to 0.06 g./l., almost one-third thereof, by the same high pressure treatment which has been performed on the leach liquor containing 12 g./l. Fe and 1.7 g./l. S, the amounts of Fe and S, respectively, have been adjusted by the air de-ironization process.

Furthermore, when the basic ferric sulphite precipitated by the air de-ironization process is subjected to the autoclave treatment without being separated by filtering in the above described process B, and the precipitate is then separated by filtering, and dried at the temperature of 100° C., the chemical analysis of the resultant product is 53.9% Fe, 12.6% S and 12.6% ignition loss. The analysis of this precipitate is close to that of $Fe_2O_3 \cdot H_2O$. Therefore it is easy to filter and separate it from precipitate. When calcined, it serves as an excellent raw material containing neither nickel nor chromium for iron manufacture.

We claim:

1. A process for treating a laterite iron ore, in finely divided form, containing nickel and chromium which comprises subjecting said ore to a reducing roast, leaching the roasted ore with dilute sulfurous acid containing about 0.5 to 3% by weight of $SO_2$, whereby nickel as well as cobalt, when the latter is present in the ore, and 5–10% of the iron contained in said ore are leached out, the leached iron being in the form of ferrous sulfite in the resultant leach liquor, while the chromium remains in the ore, agitating said liquor whereby ferrous sulfite is converted to ferric sulfite, immediately blowing air into said leach liquor while heating the latter to a temperature of 80 to 100° C. thereby decomposing said ferric sulfite to ferric sulfate and $SO_2$, and separating the precipitated ferric sulfate from the remaining liquor.

2. A process for treating a laterite iron ore, in finely divided form, containing nickel and chromium which comprises subjecting said ore to a reducing roast, leaching the roasted ore with dilute sulfurous acid containing about 0.5 to 3% by weight of $SO_2$, whereby nickel as well as cobalt, when the latter is present in the ore, and 5–10% of the iron contained in said ore are leached out, the leached iron being in the form of ferrous sulfite in the resultant leach liquor, while the chromium remains in the ore, vacuum distilling to remove excess $SO_2$ present in said liquor, agitating said liquor whereby ferrous sulfite is converted to ferric sulfite, immediately blowing air into said leach liquor while heating the latter to a temperature of 80 to 100° C. thereby decomposing said ferric sulfite to ferric sulfate and $SO_2$, and separating the precipitated ferric sulfate from the remaining liquor.

References Cited in the file of this patent

UNITED STATES PATENTS

| | | |
|---|---|---|
| 981,451 | McKechnie et al. | Jan. 10, 1911 |
| 2,197,185 | Kissock | Apr. 16, 1940 |
| 2,349,223 | Hedley et al. | May 16, 1944 |
| 2,584,700 | Hayward | Feb. 5, 1952 |
| 2,718,455 | McCormick | Sept. 20, 1955 |
| 2,816,015 | Donaldson | Dec. 10, 1957 |
| 2,946,659 | Francis | July 26, 1960 |